United States Patent [15] 3,671,604
Rutledge [45] June 20, 1972

[54] CATALYTIC COPOLYMERIZATION OF ACETYLENE AND MONOOLEFINS

[72] Inventor: Thomas F. Rutledge, Wilmington, Del.
[73] Assignee: Atlas Chemical Industries, Inc., Wilmington, Del.
[22] Filed: Oct. 21, 1970
[21] Appl. No.: 82,847

[52] U.S. Cl.............................................260/677, 260/88.2
[51] Int. Cl.........................................................C07c 11/02
[58] Field of Search...................260/673, 677, 668 B, 88.2 D

[56] References Cited

UNITED STATES PATENTS

| | | | |
|---|---|---|---|
| 1,436,819 | 11/1922 | Plauson | 260/94.1 |
| 3,097,195 | 7/1963 | Kennerly | 260/94.1 |
| 3,313,787 | 4/1967 | Valvassori | 260/79.5 |
| 3,254,140 | 5/1966 | Hagemeyer et al. | 260/897 |

Primary Examiner—Delbert E. Gantz
Assistant Examiner—J. M. Nelson
Attorney—Kenneth E. Mulford and Roger R. Horton

[57] ABSTRACT

Disclosed is a process for the catalytic copolymerization of acetylene and olefins which comprises heating a mixture of acetylene and olefin in the presence of a catalyst comprising an acidic catalyst carrier having deposited thereon a compound selected from the group consisting of zinc acetate, zinc oxide, cadmium oxide, cadmium acetate, nickel oxide, nickel acetate, cobalt oxide, and cobalt acetate. The novel products produced by the process of this invention are useful for the preparation of motor fuels and polymeric coating compositions.

9 Claims, No Drawings

CATALYTIC COPOLYMERIZATION OF ACETYLENE AND MONOOLEFINS

This invention relates to new olefinic compositions and to methods of producing such olefinic compositions. More particularly, this invention relates to the catalytic copolymerization of acetylene with olefins.

The polymerization of olefins to form hydrocarbons of higher molecular weight is known. In some instances, such copolymerization reactions may be accomplished solely by the application of heat and pressure, but in many cases the use of a catalyst is desirable. In general, catalysts cause polymerization reactions to proceed at lower temperature, decrease the number and types of polymeric materials formed, and increase the yield of desired products. Many individual materials already have been found that are active for the copolymerization of olefins. It is well established that no catalyst is the exact equivalent of any other catalyst and that products differing not only in molecular weight but also in molecular structure may be prepared through the use of different catalysts when polymerizing olefins under comparable reaction conditions.

It has been discovered in accordance with the present invention that novel olefinic products may be prepared by heating a mixture of acetylene and an olefin containing from two to five carbon atoms in the presence of a catalyst composition comprising an acidic catalyst carrier having deposited thereon from 1 to 10 percent by weight of a compound selected from the group consisting of zinc acetate, zinc oxide, cadmium oxide, cadmium acetate, nickel oxide, nickel acetate, cobalt oxide and cobalt acetate.

The catalysts used in the process of this invention are dual function catalyst since they contain sites furnished by the metal salt and acid sites furnished by the acidic catalyst carrier. The acidic catalyst carrier used may be any catalyst carrier which contain acid sites. A class of preferred catalyst contain both strong Lewis and Bronsted acid sites. Illustrative examples of acidic catalyst carrier include silica-alumina cracking catalysts, silica-magnesia, silica-zirconia, and silica-titania.

The catalysts used in the process of this invention may be prepared by impregnating a dry acidic catalyst carrier with an aqueous solution of an acetate or nitrate salt of cadmium, nickel, or cobalt of sufficient concentration to obtain the desired concentration of metal salt on the carrier. If the metal salt employed is zinc acetate, cadmium acetate, nickel acetate, or cobalt acetate, the impregnated catalyst carrier is dried to remove the water. If the metal salt employed is zinc nitrate, cadmium nitrate, nickel nitrate, or cobalt nitrate, the impregnated catalyst carrier is heated to 300° to 700° C. in the presence of air to convert the nitrate salt to the oxide.

The olefin used in the process of this invention may be a monoolefin or a diolefin. Mixtures of monoolefins, mixtures of diolefins, and mixtures of monoolefins and diolefins may also be used. Illustrative examples of olefins used in the process of this invention include ethylene, propylene, butene-1, butene-2, butadiene, 2-methyl-propene-1, pentene-1, isoprene, 2-methyl-butene-3, 2-methyl-butene-1, and pentene-2. The volume ratio of monoolefin to acetylene used may vary from 5 to 0.2, and preferably from 1 to 2.

The copolymerization reaction is carried out by contacting the mixture of olefin and acetylene with the catalyst at a temperature from 150° C. to 325° C. for sufficient time to obtain a satisfactory amount of reaction product. A preferred temperature is from 250° C. to 300° C., and a preferred reaction time is from 2 to 5 hours. The temperature may be controlled by carrying out the reaction in the presence of a fluidized bed of catalyst. The catalyst may be fluidized by the charge gas stream of acetylene and olefin.

The reaction product comprises a liquid phase and a solid phase. The liquid products are complex mixtures containing as many as thirty to forty components. These liquid products may be hydrogenated to remove any unsaturation and then used as motor fuels. The solid products are novel polymers. Vapor chromatographic studies of the non-condensed off-gases indicate that the solid products are copolymers of acetylene and olefins, with polymerized acetylene as the predominant component. Infrared examination indicates that the copolymers contain: benzene rings, some of which are ortho disubstituted; aliphatic chains which are highly olefinic, contain many short series of conjugated double bonds, contain some methylene groups, and some methyl side chains; and no terminal triple bonds. The solid reaction products may be used in the preparation of polymeric coatings. For example, the solid polymer may be reacted with a halogen and the halogenated product used in the preparation of flame-retardant coatings.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated. Example 1 is a preferred process of this invention.

EXAMPLE 1

A reactor is prepared by sealing a sintered glass disc inside and 15 centimeters from the bottom of a pyrex glass tube having a diameter of 2.5 centimeters and a length of 45 centimeters. The space below the disc is packed with one-fourth inch Cannon stainless steel packing to serve as a preheater. The space above the disc is the catalyst section of the tube. Six thermocouples, the ends 1 inch apart, are bundled together and placed in the center of the catalyst section of the tube. The end of the bottom thermocouple is 1 inch from the sintered disc. At the top of the reactor are placed two outlet tubes with coarse sintered glass disc sealed in them to filter catalysts which might be carried to the top of the reactor. These tubes are connected to a water-cooled condenser and receiver for collecting liquid products. The reactor is heated by an external electric heater.

The silica-alumina carrier employed is a fluid bed cracking catalyst, Davison F-1, consisting of microspheres and having a surface area of 563 meters per gram, pore volume of 0.76 milliliters per gram, and an average pore diameter of 54 angstroms. Two hundred grams of this carrier are mixed with 140 milliliters of distilled water solution containing 30 grams of nickel nitrate hexahydrate. This amount of solution is just enough to wet the carrier completely. The moist carrier is dried at 110° C. over night and then heated at 350° C. in a stream of air to convert nitrate to oxide.

22.1 grams of catalyst are poured into the catalyst section of the reactor and nitrogen flow started to flush the reactor. The heater is turned on and the temperature controlled by the thermocouple closest to the bottom of the catalyst bed (one inch above the disc). After flushing with nitrogen for 15 minutes at 125° C., the nitrogen is turned off and a gaseous mixture of acetylene and propylene is introduced into the reaction chamber. The acetylene is introduced at a rate of 7.5 liters per hour, and the propylene is introduced at a rate of 12.5 liters per hour. After 15 minutes at 125° C., the temperature is increased 25° C. every 15 minutes. At 250° C., conversion of gas is 33.5 percent and 6.9 times as much acetylene as propylene is reacting. The temperature is raised to 275° C. and held for 45 minutes. The temperature is then increased to 300° C. and held for 1 hour and 45 minutes. At this point, the catalyst stopped fluidizing, thereby signaling the end of the reaction. The flow of propylene and acetylene is stopped and the reactor is flushed with nitrogen for 30 minutes while it cools to room temperature. The liquid phase of the reaction product weights 2.3 grams and is a yellow liquid containing a complex mixture of aromatic hydrocarbons, branched chain olefins, and low molecular weight olefin polymers. Analysis of the product showed that it contained 45 percent of aromatic hydrocarbons, 37 percent of C8 olefins, and 20 percent of olefins containing 12 or more carbon atoms. The liquid may be hydrogenated to remove ethylenic unsaturation, and the product used as a fuel for internal combustion engines.

The solid portion of the reaction product is recovered from the catalyst by the following procedure. The dark brown catalyst is placed in a 500 ml flask, 200 milliliters of petroleum ether added, and the slurry stirred and refluxed for one half hour. The hot petroleum ether is removed by nitrogen pressure forcing it through a sintered glass thimble immersed to the bottom of the flask. Filtration time is 2 to 3 minutes. The petroleum ether extraction is repeated twice. The catalyst is then extracted three times with 200 ml portions of refluxing benzene for 15 minutes. The total polymer extracted is 10.9 grams or 89 percent of the polymer formed. The conversion to polymer is 0.15 grams per gram of catalyst per hour. The portion of the solid reaction product which is soluble in petroleum ether weighs 2.6 grams and is an orange fluffy solid having a melting range of 66° to 99° C. Analysis of the product shows 88 percent carbon and 8 percent hydrogen. The benzene soluble portion of the product weighs 8.3 grams, and is a black, dense, crisp solid having a melting range of 163°–197° C. Analysis of the product shows 91 percent carbon and 8 percent hydrogen.

The benzene soluble portion of the polymer is dissolved in carbon tetrachloride, and chlorine is bubbled into the solution at room temperature. The reaction is mildly exothermic and HCl gas is evolved. The total reaction time is 13 hours. The polymer contains 45.8 percent chlorine.

75.4 grams of polyoxypropylene (40) sorbitol, 54 ml of cellosolve acetate, 25.4 cc of tolylene diisocyanate and 60 cc of xylene are mixed together and heated at 70° to 80° C. for 3 hours. The product is then cooled to room temperature. 29 grams of the chlorinated polymer containing 45.8 percent chlorine is dissolved in 54 cc of cellosolve acetate and 60 cc of xylene. The solution of the polymer is then added to the polyurethane reaction product. The resulting varnish is brushed onto aluminum panels and the coating cured for 2 weeks at 50 percent relative humidity. The clear coatings intumesce when heated above 160° C. The intumesced films are still coherent and strong. The coating is less flammable than control coatings made the same way, but without the chlorinated polymers.

The reactor, catalyst, and reaction procedure of Example 1 are used in Example 2 to 6. The amount of catalyst, composition of charge gas, reaction time, and maximum reaction temperature used in each example and the amount of reaction product obtained are as shown in Table I.

[3] 7.5 liters of acetylene per hour and 12.5 liters of propylene per hour.
[a] 5% zinc oxide supported on silica-alumina carrier.
[b] 5% zinc acetate supported on silica-alumina carrier.
[c] 3.8% cobalt oxide supported on silica-alumina carrier.
[d] 5% cobalt acetate supported on silica-titania carrier.
[e] 3% cadmium oxide supported on silica-alumina carrier.
[f] 5% cadmium acetate supported on silica-zirconia carrier.
[g] 10% nickel acetate suppored on silica-magnesia carrier.

EXAMPLE 14

The reactor, catalyst, and reaction procedure of Example 1 are used to copolymerize a mixture of acetylene and butadiene. The charge gas consists of 7 liters of acetylene per hour, 7 liters of butadiene per hour, and 7 liters of nitrogen per hour. The reaction time is 3 hours, and the maximum reaction temperature is 200° C. The amount of catalyst employed is 10 grams. The resulting product is a complex mixture of acetylene-butadiene copolymers of different molecular weights.

EXAMPLE 15

The procedure of Example 1 is repeated using 35 grams of catalyst and a charge gas of 7 liters of acetylene per hour and 14 liters of isoprene per hour. The reaction product is a mixture of acetylene-isoprene polymers of various molecular weights and various amounts of unsaturation.

Although this invention has been described with reference to specific catalyst carriers, metal salts, and olefins and to specific reaction conditions, it will be appreciated that numerous other catalysts and olefins may be substituted for those described and that the particular reaction conditions employed may be modified, all within the spirit and scope of this invention.

Having thus described the invention, what I desire to secure by Letters Patent is:

1. A process of preparing acetylene-olefin compounds which comprises heating at a temperature from 150° to 325° C. a mixture of acetylene and an olefin containing from two to five carbon atoms in the presence of a catalyst comprising an acidic catalyst carrier having deposited thereon from 1 to 10 percent by weight of a compound selected from the group consisting of zinc acetate, zinc oxide, cadmium oxide, cadmium acetate, nickel oxide, nickel acetate, cobalt oxide and cobalt acetate.

2. A process of claim 1 wherein the olefin is a monoolefin.

TABLE I

| Example Number | Grams of catalyst | Charge gas | Reaction time, hours | Temperature, °C | Total product Grams liquid | Total product Grams solid | Solid product, percent Petroleum ether, soluble | Solid product, percent Benzene soluble |
|---|---|---|---|---|---|---|---|---|
| 2 | 17.0 | (¹) | 3 | 250 | 1.8 | 2 | 50 | 50 |
| 3 | 24.6 | (²) | 7 | 300 | 7.2 | 7.4 | 22 | 78 |
| 4 | 29.2 | (³) | 4¼ | 300 | 7 | 9.5 | 51 | 49 |
| 5 | 27.9 | (⁴) | 3¾ | 275 | 31.9 | 9.5 | 60 | 40 |
| 6 | 30 | (⁵) | 3½ | 300 | 11.9 | 12.5 | 44 | 56 |

[1] 7 liters of acetylene per hour and 7 liters of propylene per hour.
[2] 5 liters of acetylene per hour and 10 liters of propylene per hour.
[3] 7.5 liters of acetylene per hour and 12.5 liters of propylene per hour.
[4] 7.5 liters of acetylene per hour and 7.5 liters of isobutylene per hour.
[5] 10 liters of acetylene per hour and 5 liters of isobutylene per hour.

Examples 7 to 13 use the reactor and reaction procedures of Example 1. The composition and amount of catalyst, composition of charge gas, reaction time, and maximum reaction temperature used in each example are as shown in Table II.

3. A process of claim 1 wherein the olefin is a diolefin.
4. A process of claim 2 wherein the monoolefin is ethylene, propylene, or isobutylene.
5. A process of claim 1 wherein the compound is zinc oxide

TABLE II

| Example Number | Grams of catalyst | Catalyst | Charge gas | Reaction time, hours | Temperature, °C. | Total product Grams liquid | Total product Grams solid | Solid product, percent Petroleum ether, soluble | Solid product, percent Benzene, soluble |
|---|---|---|---|---|---|---|---|---|---|
| 7 | 27.7 | (ª) | (¹) | 3¼ | 275 | 21.4 | 13.5 | 74 | 26 |
| 8 | 24.4 | (ᵇ) | (¹) | 3¾ | 275 | 25.4 | 10.9 | 80 | 20 |
| 9 | 26.9 | (ᶜ) | (²) | 2½ | 300 | 3 | 0.8 | 0 | 100 |
| 10 | 25 | (ᵈ) | (¹) | 5 | 150 | | | | |
| 11 | 26 | (ᵉ) | (³) | 4 | 300 | 3.1 | 8.8 | 26 | 74 |
| 12 | 21 | (ᶠ) | (¹) | 3 | 250 | | | | |
| 13 | 28 | (ᵍ) | (³) | 2 | 325 | | | | |

[1] 7.5 liters of acetylene per hour and 7.5 liters of isobutylene per hour.
[2] 7.5 liters of acetylene per hour and 7.5 liters of propylene per hour.

or zinc acetate.

6. A process of claim 1 wherein the compound is cadmium oxide or cadmium acetate.

7. A process of claim 1 wherein the compound is nickel oxide or nickel acetate.

8. A process of claim 1 wherein the compound is cobalt oxide or cobalt acetate.

9. A process of claim 1 wherein the gaseous mixture of acetylene and olefin is heated in the presence of a fluidized bed of the catalyst.

* * * * *